Patented Dec. 18, 1951

2,579,259

UNITED STATES PATENT OFFICE 2,579,259

2,4-DIAMINO-5-BENZYLPYRIMIDINES 2

George H. Hitchings, Tuckahoe, and Elvira A. Falco, New Rochelle, N. Y., assignors to Burroughs Wellcome & Co. (U. S. A.) Inc., Tuckahoe, N. Y., a corporation of New York No Drawing. Application September 26, 1950, Serial No. 186,915

4 Claims. (Cl. 260—256.4)

This present invention relates to new chemical compositions and in particular to certain 5-benzyl-2,4-diaminopyrimidines, having substituent groupings in the benzene ring portion of the molecule. These compounds have been found to possess high anti-malarial activity. When tested experimentally, compounds of the aforementioned character are found to be highly effective therapeutic agents against such experimental malarias as Plasmodium berghei in mice, Plasmodium gallinaceum in chicks and Plasmodium cynomologi in monkeys.

This application is a continuation in part of U. S. applications Serial Nos. 134,866, filed December 23, 1949, and 161,256, filed May 10, 1950.

The present compositions having the specific indicated activity may be represented by the following formula:

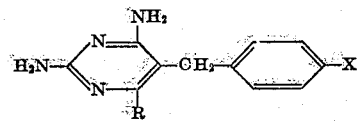

wherein X is selected from the group consisting of chloro, bromo and nitro radicals and R is a member of the class consisting of hydrogen and the methyl radical.

The value for X and R given above are quite specific for the anti-malarial activity. Replacement of R by alkyl radicals higher than methyl results in marked diminution in therapeutic action. Similarly, if X is hydrogen, methoxyl and the like, or if X is chlorine and in the ortho rather than the para position, anti-malarial activity is substantially zero.

The compounds are prepared by the condensation of a substituted α-formylhydrocinnamic ester or an α-benzylacetoacetic ester with guanidine, followed by chlorination and amination of the resultant aminohydroxypyrimidine:

The following examples illustrate the teachings of this invention but in no way limit its scope which is defined by the claims.

EXAMPLE 1

2,4-Diamino-5-p-chlorobenzylpyrimidine

A. 2-Amino-4-hydroxy-5-p-chlorobenzylpyrimidine.

To 12.6 g. (0.548 mole) of sodium wire in 1500 ml. of sodium-dried ether were added slowly down a reflux condenser a mixture of 116.5 g. of ethyl-p-chlorohydrocinnamate (0.548 mole) and 44.6 g. of ethyl formate (0.6 mole). This reaction mixture was allowed to stand overnight and then to it was added a mixture of 12.6 (0.548 mole) of sodium in 500 ml. of absolute ethanol and 52.3 g. (0.548 mole) of guanidine hydrochloride. The ether was boiled off and the mixture was refluxed for 4 hours on the steam bath. The mixture was then poured into 2 liters of water and neutralized with glacial acetic acid. The precipitate thus formed was filtered off and washed with 50% ethanol. The product recrystallized by solution in dilute alkali and precipitation with dilute acetic acid melts at 278–282°.

B. 2,4-Diamino-5-p-chlorobenzylpyrimidine.

15 g. of 2-amino-4-hydroxy-5-p-chlorobenzyl pyrimidine (0.0637 mole) were refluxed with 150 ml. of phosphorous oxychloride for ½ hour. The excess reagent was taken off in vacuo and the residue decomposed by pouring over 200 grams of ice. This was made alkaline with ammonium hydroxide to pH 9 and filtered. The crude 2-amino-4-chloro-pyrimidine was sucked dry and placed in a bomb with 200 ml. of saturated (10°) ethanolic ammonia. The bomb was heated at 150° for 16 hours, opened and the alcohol evaporated on the steam bath. The residue was taken up in dilute acetic acid and

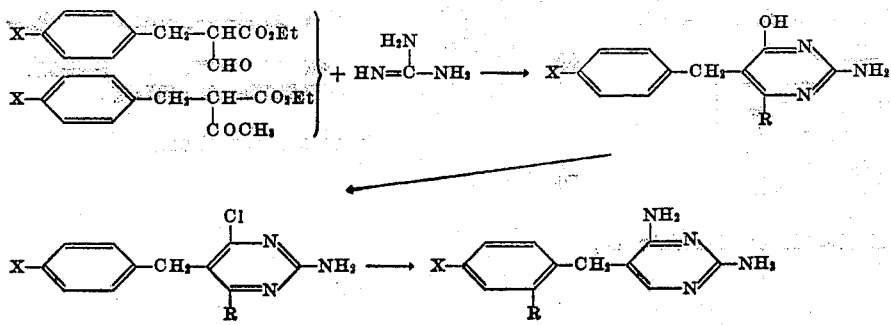

precipitated by the addition of sodium hydroxide to pH 10. The resulting precipitate was filtered and recrystallized from 95% ethanol, to give white needles melting at 205–208°.

EXAMPLE 2

2,4-Diamino-5-p-chlorobenzyl-6-methylpyrimidine

A solution of 23 g. of sodium in 300 ml. of absolute ethanol was prepared and to this was added 130 g. of ethylacetoacetate. After cooling at 30°, 161 g. of p-chlorobenzylchloride was added, the solution was allowed to stand 1 hour and was then refluxed 1 hour on the steam bath. The sodium chloride which had been formed was removed by filtration and 108 g. of the alpha-p-chlorobenzylacetoacetic ester was isolated by distillation in vacuo boiling at 197° 15–20 mm.

The above ester (57 g.) was dissolved in 1 liter of absolute alcohol, 22 g. guanidine carbonate was added and the mixture refluxed for 5 hours. The reaction mixture was poured into 2 liters of water, neutralized with acetic acid and the 2-amino - 4 - hydroxy-5-p-chloro benzylpyrimidine was obtained by filtration. After purification by solution in aqueous alkali and precipitation by acid the yield was 40 g.

The amino-hydroxypyrimidine from the previous reaction (15 g.) was refluxed with phosphorous oxychloride (100 ml.) for 30 minutes. After removal of the excess phosphorylchloride by distillation in vacuo, the residue was poured over ice and the mixture was made slightly alkaline with ammonia. The 2-amino-4-chloropyrimidine was removed by filtration, transferred to a bomb and heated at 155–60° for 16 hours with 100 ml. of an alcoholic solution which had been saturated with ammonia gas at 0–5°. The contents of the bomb were evaporated to dryness and the solid was leached with 25 ml. of 2N sodium hydroxide solution. The solid was purified by solution in dilute aqueous hydrochloric acid and precipitation with sodium hydroxide. After two such recrystallizations there remained 8.75 g. of colorless needles melting at 235–6°.

EXAMPLE 3

2,4-Diamino-5-p-bromobenzyl-6-methylpyrimidine

The method of Example 1 was employed to produce 2,4-diamino-5-p-bromobenzyl-6-methylpyrimidine in the form of needles melting at 239–41°.

EXAMPLE 4

2,4-Diamino-5-nitrobenzylpyrimidine (a) 2-Amino-4-hydroxy - 5 - benzylpyrimidine was prepared from ethyl hydrocinnamate in the manner previously described to give a compound melting at 235–239°. This was chlorinated and aminated in the usual manner to give 2,4-diamino-5-benzylpyrimidine melting at 194–199°.

ANALYSIS

|   | Theory | Found |
|---|---|---|
| C | 66.0 | 66.01 |
| H | 6.0 | 5.72 |
| N | 28.0 | 27.8 |

(Literature M. P. Kast=145–6° Berichte 45, p. 3134.)

(b) 1.7 g. of 2,4-diamino-5-benzylpyrimidine was dissolved in 20 ml. of concentrated sulfuric acid and cooled to —5°. To this was added 1.4 g. potassium nitrate keeping the temperature below 10°. The mixture was then poured over 50 g. of ice and the resulting precipitate filtered. This was then placed in hot water and filtered into an excess of dilute alkali. After one more crystallization from dilute acid and precipitate with alkali, 1.5 g. of a yellow crystalline compound resulted, which melted at 238–9°.

EXAMPLE 5

2,4-Diamino-5-p-nitrobenzyl-6-methylpyrimidine

The ethyl p-nitrobenzylacetoacetate was prepared from p-nitrobenzylbromide, sodium hydroxide and ethylacetoacetate in 90% alcohol according to Burgess, J. Chem. Soc. 2017 (A 27). The crude produce was obtained in 65% yield, melting at 40–43°. (Literature 43–5°.)

The crude ethyl p-nitrobenzylacetoacetate was condensed with guanidine, as in Example 2, giving 2-amino-4-hydroxy-5-p-nitrobenzyl-6-methylpyrimidine. The latter on chlorination and amination in the usual way gave 2,4-diamino-5-p-nitrobenzyl-6-methylpyrimidine, M. P. 240–2°.

The same compound was prepared by the nitration of 5-benzyl-2,4-diamino-6-methylpyrimidine. To 1.8 g. of the latter in 20 ml. of concentrated sulfuric acid at —5°, 1.4 g. of potassium nitrate was added in small portions with stirring over the course of one hour. The mixture was poured over 150 g. of ice. After standing the crystals were obtained by filtration and purified by solution in 50 ml. of hot water followed by the addition of sodium hydroxide to about pH 10. The product melted at 240–1°. A mixture of the substances prepared by the two methods, melted at 241°.

Since the base is the physiologically active moiety in any non-toxic salt of the compounds described herein, said non-toxic salts of these derivatives are to be regarded as equivalents of the uncombined bases described in the specification and claims herein.

We claim:

1. A 5-benzylpyrimidine of the formula:

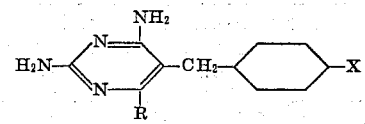

where X is selected from the class consisting of the chloro, bromo and nitro groups and R is selected from the class consisting of hydrogen and the methyl radical.

2. 5-p-chlorobenzyl-2,4-diamino - 6 - methylpyrimidine.

3. 5-p-bromobenzyl-2,4-diamino - 6 - methylpyrimidine.

4. 2,4-Diamino-6-methyl- 5 -p-nitrobenzylpyrimidine.

GEORGE H. HITCHINGS.
ELVIRA A. FALCO.

No references cited.